United States Patent
Auspitz et al.

(10) Patent No.: US 6,834,280 B2
(45) Date of Patent: Dec. 21, 2004

(54) SYSTEMS AND METHODS FOR DETERMINING SEMIOTIC SIMILARITY BETWEEN QUERIES AND DATABASE ENTRIES

(75) Inventors: Josiah Lee Auspitz, 17 Chapel St., Somerville, MA (US) 02144; Kilian Stoffel, Colombier (CH)

(73) Assignee: Josiah Lee Auspitz, Somerville, MA (US)

(*) Notice: Subject to any disclaimer, the term of this patent is extended or adjusted under 35 U.S.C. 154(b) by 160 days.

(21) Appl. No.: 09/993,253

(22) Filed: Nov. 19, 2001

(65) Prior Publication Data

US 2002/0198871 A1 Dec. 26, 2002

Related U.S. Application Data

(63) Continuation of application No. 09/778,599, filed on Feb. 7, 2001, now abandoned
(60) Provisional application No. 60/180,674, filed on Feb. 7, 2000.

(51) Int. Cl.[7] .............................................. G06F 17/30
(52) U.S. Cl. ......................... 707/3; 707/104.1; 704/7; 704/9
(58) Field of Search ..................... 707/3, 4, 104.1; 704/1, 7, 9

(56) References Cited

U.S. PATENT DOCUMENTS

| | | | |
|---|---|---|---|
| 4,273,542 A | 6/1981 | Zellweger | 434/433 |
| 4,367,066 A | 1/1983 | Zellweger | 434/433 |
| 4,504,236 A | 3/1985 | Zellweger | 434/433 |
| 5,109,509 A | 4/1992 | Katayama et al. | 704/9 |

(List continued on next page.)

FOREIGN PATENT DOCUMENTS

| | | | |
|---|---|---|---|
| CA | 1142750 | 3/1983 | G09B/1/32 |
| WO | WO 89/03083 | 4/1989 | G06F/3/16 |
| WO | WO 01/73607 | 10/2001 | G06F/17/30 |

OTHER PUBLICATIONS

Esposito, Joseph, "Pierce's Theory of Semiosis: Toward a Logic of Mutual Affection", Copyright 1999, downloaded on 9/16/200 at http://www.chass.utoronto.ca/epc/srb/cyber/espout.html.*

Gudwin et al, "Computational Semiotics: An Approach for the Study of Intelligent System Part 1: Foundation", Technical report RT–DCA 09, DCA–FEEC–UNICAMP, 1997, 24 pages.*

Rieger, B., "A Systems Theoretical view on computational Semiotics. Modeling text understanding as meaning constitution by SCIPS", Intelligent Control (ISIC), Sep. 14–17, 1998, pp. 840–845.*

Burch, Robert, "A Peircean Reduction Thesis, The Foundation of Topological Logic", Texas Tech University Press, 1991.*

Deerwester, et al., "Indexing by Latent Semantic Analysis," *American Society for Information Science*, 41(6):391–407 (1990).

(List continued on next page.)

*Primary Examiner*—Srirama Channavajjala
*Assistant Examiner*—Khanh Pham
(74) *Attorney, Agent, or Firm*—Foley Hoag LLP

(57) ABSTRACT

A semiotic analysis system, computer readable medium and method are described. The system has a computer and a searchable database in communication with the computer. The database has a piece of media, a portion of which is associated with a semiotic describer. The computer readable medium has pieces of media, at least one of which has a portion identified by a semiotic describer. The method includes providing a database of pieces of media, portions of which are associated with a semiotic describer. A query having a semiotic signifier is provided, and the query is used to search for and retrieve possibly relevant media corresponding to the query.

21 Claims, 2 Drawing Sheets

U.S. PATENT DOCUMENTS

| | | | | |
|---|---|---|---|---|
| 5,299,125 A | | 3/1994 | Baker et al. | 364/419.08 |
| 5,317,647 A | | 5/1994 | Pagallo | 382/14 |
| 5,317,688 A | | 5/1994 | Watson et al. | 345/707 |
| 5,642,502 A | | 6/1997 | Driscoll | 707/5 |
| 5,696,962 A | * | 12/1997 | Kupiec | 707/4 |
| 5,715,468 A | | 2/1998 | Budzinski | 704/9 |
| 5,734,916 A | | 3/1998 | Greenfield et al. | 715/530 |
| 5,748,841 A | | 5/1998 | Morin et al. | 704/257 |
| 5,748,974 A | | 5/1998 | Johnson | 704/9 |
| 5,761,637 A | | 6/1998 | Chino | 704/231 |
| 5,794,050 A | | 8/1998 | Dahlgren et al. | 717/144 |
| 5,799,268 A | | 8/1998 | Boguraev | 704/9 |
| 5,805,775 A | | 9/1998 | Eberman et al. | 706/11 |
| 5,818,445 A | | 10/1998 | Sanderson et al. | 345/334 |
| 5,940,821 A | * | 8/1999 | Wical | 707/3 |
| 5,960,384 A | | 9/1999 | Brash | 704/9 |
| 5,963,739 A | | 10/1999 | Homeier | 717/126 |
| 5,963,940 A | | 10/1999 | Liddy et al. | 707/5 |
| 5,963,965 A | * | 10/1999 | Vogel | 715/501.1 |
| 6,026,388 A | | 2/2000 | Liddy et al. | 707/1 |
| 6,076,088 A | | 6/2000 | Paik et al. | 707/5 |
| 6,105,046 A | | 8/2000 | Greenfield et al. | 715/530 |
| 6,112,168 A | | 8/2000 | Corston et al. | 704/9 |
| 6,243,713 B1 | * | 6/2001 | Nelson et al. | 707/104.1 |
| 6,275,817 B1 | * | 8/2001 | Reed et al. | 706/45 |
| 6,389,406 B1 | * | 5/2002 | Reed et al. | 706/46 |

OTHER PUBLICATIONS

Elkins, James, "Problems with Peirce: Visual Culture: A Skeptical Reader," *Online* (Oct. 12, 2001) <URL:http://www.jameselkins.com/Texts/Peirce.pdf>, XP002242578, pp. 132–152 (Retrieved on Jun. 2, 2003).

European Search Report completed on Jun. 2, 2003 and mailed Jun. 18, 2003.

* cited by examiner

SYSTEMS AND METHODS FOR DETERMINING SEMIOTIC SIMILARITY BETWEEN QUERIES AND DATABASE ENTRIES

CROSS CLAIM TO RELATED APPLICATION

This application is a continuation of and priority is hereby claimed to copending U.S. patent application Ser. No. 09/778,599 filed Feb. 7, 2001 now abandoned. The U.S. patent application Ser. No. 09/778,599 claims priority to U.S. Provisional Patent Application No. 60/180,674 filed on Feb. 7, 2000. The benefit of U.S. patent application Ser. No. 09/778,599 and U.S. Provisional Patent Application No. 60/180,674 is hereby claimed.

BACKGROUND OF THE INVENTION

1. Field of the Invention

The present invention relates generally to devices and methods of analyzing, and to devices and methods of categorizing data.

2. Discussion of Related Art

In the prior art, there are devices and methods that categorize and analyze text data. One example is disclosed in U.S. Pat. No. 6,006,221 (the "'221 Patent"). The '221 Patent discloses a document retrieval system where a user can enter a query and retrieve documents from a database. Each document in the database is subjected to a set of processing steps to generate a language-independent conceptual representation of the subject content of the document. A query is also subjected to a set of processing steps to generate a language-independent conceptual representation of the subject content of the query. The documents and queries can also be subjected to additional analysis to provide additional term-based representations, such as the extraction of information-rich terms and phrases. Documents are matched to queries based on the conceptual-level contents of the document and query, and optionally, on the basis of the term-based representation. The query's representation is then compared to each document's representation to generate a measure of relevance of the document to the query.

The prior art systems sometimes suffer from an inability to properly identify some relevant documents. The prior art systems sometimes suffer from an inability to properly measure the document's relevance to the query.

SUMMARY OF THE INVENTION

The invention described and claimed herein represents an improvement over prior art systems in that in many situations, the invention is better able to properly identify relevant documents, and is better able to properly measure the document's relevance to the query. Moreover, the invention provides a unified architecture to integrate multiple media and heterogeneous databases so that they can be analyzed and traversed with a single query. The invention structures data to permit complex analytic operations and to equip automated agents to perform these operations in interaction with signals provided by a user, a changing data environment, or other automated agents. The invention also is able to preserve semiotic information not captured by prior art systems.

The invention includes a system that has a searchable database. The database has pieces of media. At least some of the pieces of media have associated therewith a describer. For example, a describer may indicate a relationship between portions of the piece of media, or a describer may indicate how the portion is used, interpreted or its effect.

The invention also includes a computer readable medium having pieces of media thereon. At least one of the pieces of media has a portion identified by a describer. The describer indicates a semiotic property of the portion.

The invention also includes a method wherein a database of pieces of media is provided with describers corresponding to portions of a piece of media. A query having semiotic signifiers is provided. The query is used to search for and retrieve possibly relevant media corresponding to the query.

BRIEF DESCRIPTION OF THE DRAWINGS

For a fuller understanding of the nature and objects of the invention, reference should be made to the following detailed description taken in conjunction with the accompanying drawings, in which.

DETAILED DESCRIPTION OF THE INVENTION

Figure 1:
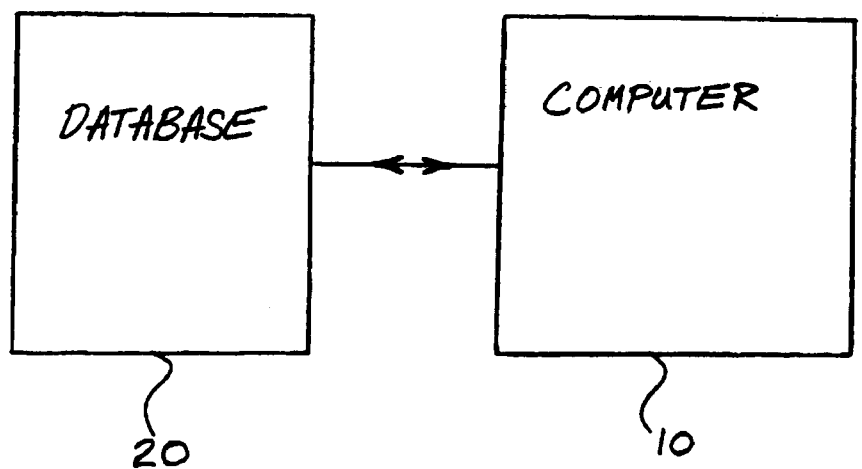
FIG. 1 is a schematic representation of a system according to the present invention that includes a computer in communication with a database.

FIG. 1 shows a system according to the present invention. The system includes a computer 10 that has software thereon. When the software is running, the computer 10 will accept a query from a user, and then search a database 20 for pieces of media that may be relevant to the query.

The system also includes a database 20 that is in communication with the computer 10. The computer 10 has pieces of media. For example, a piece of media may be text of a document, or a recording of an audio or video presentation. The database 20 may exist on a computer readable medium and may have the pieces of media thereon. Examples of computer readable mediums are a floppy disk, a compact disc, a random access memory and a read only memory. At least one of the pieces of media has a portion identified by at least one describer. The describer indicates a semiotic property of the portion.

The describers provide information about portions of the piece of media. For example, if the piece of media includes text, it may be desirable to associate one or more describers with a portion of the text in order to provide additional information about the portion.

When it is desired to search the database 20 for relevant media, a query is developed, and certain portions of the query may be associated with one or more signifiers. For example, the query may include words, some of which are associated with signifiers, and the database 20 described above may be searched for the words, and if the words are found in the database 20, a determination is made as to whether describers matching the signifiers are present. The query is entered into the computer 10, which then searches the database 20 for pieces of media that may be relevant to the query. For example, if words and signifiers in the query match words and describers in the database 20, the corresponding piece of media is identified as possibly being particularly relevant to the query.

A portion of a piece of media may have many corresponding describers. A portion of a query may also have many corresponding signifiers. Pieces of media that are highly related to a query will have more matches between describers and signifiers than pieces of media that are not highly related to the query. For example, consider a portion of a query that has five signifiers associated with it, a first document that has a portion of text with four describers associated with it, and a second document that has the same portion of text with seven describers associated with it. Assume the first document's describers include four of the five signifiers, but the second document's describers include only two of the five signifiers. When the database 20 is searched, the first document will be identified with the query to a greater degree than will the second document because a greater number of the first document's describers match the query's signifiers. The user may then be provided with a prioritized list of documents that may be related to the query. For example, the first document may be listed on the prioritized list before the second document.

In some instances, some describers may be more indicative of the content of the media than other describers, and so the more indicative describers may be given greater weight than the less indicative describers. Similarly, some signifiers may be more indicative of the content of the query than other signifiers, and so the more indicative signifiers may be given greater weight than the less indicative signifiers. In such a system of weighted describers and weighted signifiers, when a match is found between a describer and a signifier, the weight attributable to a describer or signifier may be used to provide an indication that the corresponding media may be of greater relevance to the query than are other media that have matching but unweighted describers and signifiers. For example, the weights of describers and signifiers may be mathematically combined, for example added or multiplied together, to provide a total weight of the matched pair of describer and signifier. To illustrate this, consider a query that has ten signifiers associated with a particular portion of the query, one of which is weighted by a factor of two to indicate that the weighted signifier is particularly indicative of the query. Consider a portion of a first piece of media that has five describers, two of which are weighted by a factor of three to indicate that the weighted describers are particularly indicative of the portion. Also consider a second piece of media that has seven describers, none of which are weighted, associated with the same portion found in the first piece of media. If the database 20 is searched, assume the query results in the portion of the first piece of media being identified, and results in the portion of the second piece of media being identified. If three of the describers in the portion of the first piece of media match three of the signifiers, and the weighted describers and signifiers are among those that are matched, then the first piece of media will be identified as being of particular relevance to the query. However, if three of the describers in the portion of the second piece of media match three of the signifiers, although the second piece of media is identified, the second piece of media will not be identified as being of particular relevance to the query. In this example, the first piece of media will be determined to be more relevant to the query than the second piece of media. In a prioritized list of media discovered by the search, the first piece of media will be listed as being more relevant than the second piece of media. Note that the search query may be generalized to include complex learning and mining algorithms, as well as agent communication protocols, as described below.

One means of providing describers and signifiers (collectively referred to herein as "indicators") is to use a multi-dimensional set of indicators that can be used to describe and categorize portions of pieces of media and portions of pieces of a query. Then, when a describer or signifier is needed, the describer or signifier may be selected from the indicators. It should now be clear that describers are indicators that correspond to media, while signifiers are indicators that correspond to queries. The multi-dimensional set of indicators described herein is an example of a semiotic method according to the present invention that divides and classifies portions of pieces of media or queries.

In the field of semiotics, the sign relation ("S") is a triadic primitive entailing the object ("O"), the sign ("R" for "representamen"), and some effect the sign may have upon an interpreting mind or quasi-mind ("I" for 'interpretant'). O-R-I is thus an irreducible triadic relation involving Object-Representamen-Interpretant. Traditionally, the global information space is divided into three dyads. A first traditional dyad addresses the relation R-O, and is known as "semantics", which deals with the relation of sign to object. A second traditional dyad addresses the relation R-R, and is known as "syntactics", which deals with the relation of sign to sign. A third traditional dyad addresses the relation R-I, and is known as "pragmatics", which deals with meaning, or relation of sign to interpretant. This traditional division of the global information space reduces a triadic relation to three dyads, which according to Peirce's reduction theorem, is not possible without a semiotic loss. For more on Peirce's reduction theorem, see *A Peircean Reduction Thesis: The Foundations Of Topological Logic*, by Robert W. Burch, 1991. Those familiar with Peirce's teachings will know that relations of more than three are reducible to triads, but triads are not reducible to dyads and monads without semiotic loss. A goal of the invention is to reduce, if not eliminate, the semiotic loss associated with the traditional division of the global information space.

Instead of subdividing global information space into three dyads at the outset, the invention treats the triadic relation as continuous with respect to breadth and depth. With respect to breadth, every interpretant may itself be viewed as a sign relation, with its own object and interpretant; the O-R-I relation thus entails a continuum of semiosis, with each sign generating another.

Figure 2:
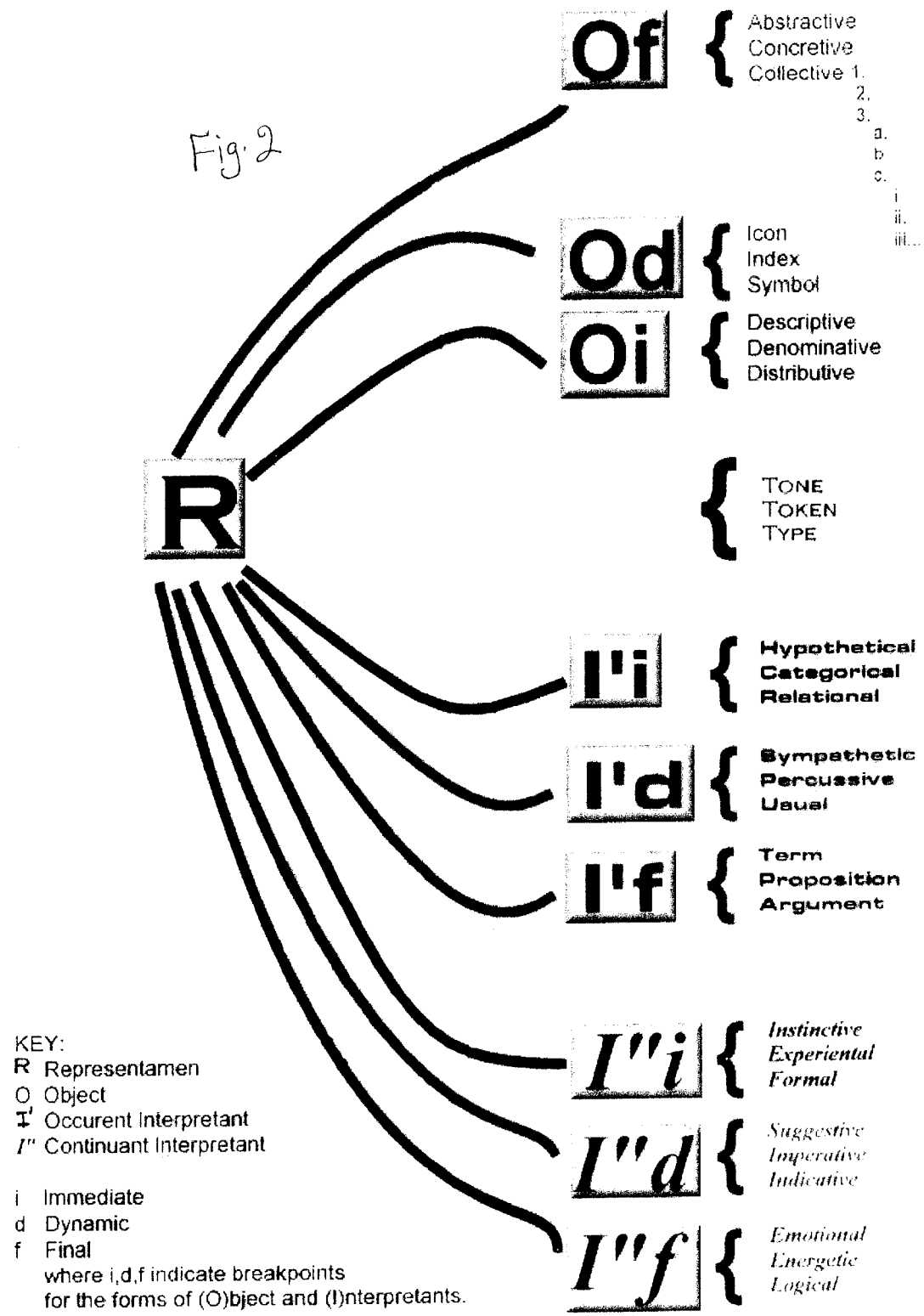
FIG. 2 represents a ten dimensional semiotic division of the global information space according to the present invention.

With respect to depth, any breakpoint along the continuum entails many possibilities that are resolvable and refinable into triadic patterns. For purposes of describing the invention, ten breakpoints (also referenced herein as "dimensions") along an O-R-I continuum are delineated, and each dimension is divisible into three sign elements. FIG. 2 illustrates such a ten dimensional continuum. Each sign element may be divided into sub-elements. From time to time it is helpful to refer to the sign elements as being "valence" representations of the corresponding dimension, and it is helpful to refer to the sub-elements as being "granular" representations of the corresponding sign element. In this manner, a "richness" or "density" can be realized and exploited in order to properly identify a piece of media with a query. It should be noted that any datum may be represented by many sign elements in any given dimension. This ability to describe a datum with more than one sign element is referred to herein as "compossiblity". The compossible aspect of the present invention preserves information that is not preserved by representations of data that allow only one sign element to be associated with a datum.

The dimensions in this example are not arbitrarily delineated. Delineation of dimensions is determined by three categories of thought that are postulated as fundamental. First, the "immediate" conception of a thing in isolation (requiring only one element); second, the "dynamic" conception of the thing in direct relation to some other (requiring two elements); and third, the "final" conception of the thing in mediated relation to some other (requiring three elements). These three categories may be considered to be moments of thought i.e. first, we conceive the object of our thought in isolation (as a definition vis-a-vis some other object (a "Secondness")), then as mediated by some sign or other betweenness (a "Thirdness"). We shall use the subscripts i, d and f for immediate, dynamic and final, respectively.

For purposes of distinguishing between the dimensions, Roman numerals I through X are used below. No hierarchy is implied by use of the Roman numerals. To give the dimensions greater descriptive force, we use some of Peirce's often difficult terms for the compossible sign elements within them, but it should be borne in mind that the terms for the sign elements are illustrative and do not exhaust their implications. Each sign element may be thought of as a valance of the dimension with which it is associated. The categories of "firstness", "secondness" and "thirdness" may be applied throughout the invention. Similarly, where examples are given, this should not be taken to mean that the example is a pure one to which no other sign element might apply, but simply that it bears the particular modality under discussion. It should be recognized that the application of one sign element does not exclude others within the same dimension. With this in mind, the dimensions are:

I. R-O sub i: the representamen in relation to the immediate object—that is, the object as contained only in the information of the sign. This is, in fact, the only way a computer 'knows' the object. On this dimension there are three sign elements: descriptive, denominative, distributive. Examples of sign elements within this dimension are (1) a descriptor of the object: e.g. "blue", (2) a name of the object that distinguishes it from one or more others, for example, "Blue Boy" (the painting by Gainsborough), (3) a distributed property, rule or rule-like relation (or "copulant" in Peirce's terminology) of a class of objects, for example, the "-ness" aspect of "blueness", or the equal sign ("=") or implication sign (">") in their role as universal copulants.

II. R-O sub d: the representamen in relation to the dynamic object, that is, the object in its relations with the world. On this dimension we have Peirce's famous icon-index-symbol sign elements. When the relation of the sign element to its dynamic object is iconic, the sign element represents the object by likeness or resemblance, for example, Blue Boy seen as a portrait of the model. When the relation of the sign to its dynamic object is indexical, it represents the object by reference to some collateral information, for example, the pallor of Blue Boy's face seen by a physician as a symptom of nutritional deficiency. When the relation of the sign to its dynamic object is symbolic, the sign represents the object by some convention or arbitrary habit of association, for example, the English word 'boy' a symbol composed of the letters b-o-y.

III. R-O sub f: the representamen in relation to the mode of being of the object, that is, the object once we have attached a settled conception to it i.e. the "final" object, as opposed to the "dynamic" or "immediate" object. In this dimension, the object may be compossibly abstractive, concretive, collective. The object is abstractive insofar as the sign represents it as an isolate, for example, "atom". This draws on the etymological meaning of abstract, "to pull out" one element to the exclusion of others. The object is concretive insofar as the sign represents it as composed of relations, for example, "molecule". This draws on the etymological meaning of concrete as "growing together" of one element into another. The object is collective insofar as the sign represents it as an assemblage or grouping, for example, "matter". This draws on the etymological meaning of a collection as a "gathering together".

Dimensions along the continuum between representamen and interpretant, R-I are set using the immediate-dynamic-final moments of analysis. However, here there is a further two step division depending on whether the interpretant is viewed as an occurrent or continuant, that is, as a discrete effect or as partaking of a stream of activity (herein sometimes referred to as a "process"). We shall use I' for the interpretant as occurrent and I" for the interpretant as continuant, and again use the subscripts i, d, and f for immediate, dynamic and final.

IV. R-I' sub i: the representamen in relation to its immediate interpretant, that is, the interpretant in its first blush or flash of meaning. In this dimension the interpretant may be, in Peirce's terminology, hypothetical, categorical, relative, according to whether it is a "might possibly be", an "is", or an "is-a-sign of" in some context.

V. R-I' sub d: the representamen in relation to its dynamic interpretant, that is the interpretant as it effects or generates other signs. In this dimension the interpretant may be sympathetic, percussive/shocking, usual/habitual.

VI. R-I" sub f: what the representamen might signify when settled into its final scope or sphere or influence. In a first valence in this dimension, the occurrent final interpretant may be a mere signifier or term, or more generally a "seme" in Peirce's Greek-derived terminology; For example, "theory" in its barest denotational sense. In a second valence, the occurrent final interpretant may be a proposition, or more generally a "pheme", from the Greek for affirming or asserting; For example, "the theory of relativity" in its propositional force. In a third valence, the occurrent final interpretant may be an argument, or more generally, a "delome" from the Greek for making known, showing or explaining; For example "E=mc2" in its explanatory force.

VII. R-I" sub i: the representamen in relation to the stream of activity or process of its immediate interpretant, that is, as it receives assurance from the activity of interpretation. In this dimension the interpretant may be instinctive, experiential, formal.

VIII. R-I" sub d: the representamen in relation to the process of its dynamic interpretant, that is, as it appeals to or becomes part of some ongoing activity interpretation. In this dimension, the interpretant may be suggestive, imperative/interrogative, indicative.

IX. R-I" sub f: the representamen in relation to its eventual purpose, that is, in the light of what it leads to. In this dimension the mode of the interpretant may be gratific (leading to emotion), energetic (leading to action), logical (leading to understanding and, with respect to action, self control).

X. Finally, we may consider the sign in itself, without regard to its relation to object or interpretant. In this dimension, relevant sign elements include tone-token-type or, more generally, in Peirce's neologisms as a qualisign, sinsign, or legisign. The tone is the mode of the sign's intensity. The token is the mode of its particularity. The type is the mode of its generality. It is worth noting that "tone" may be further differentiated using other sign elements of the interpretant in other dimensions; For example, sympathetic-percussive-usual from Dimension V, instinctive from Dimension VII-valence 1, suggestive from Dimension VIII-valence 1, emotional from Dimension IX-valence 1).

In summary, the ten dimensions are listed below, along with three sign elements within each dimension. The sign elements are shown below with a corresponding reference number (1, 2 or 3) that is referred to herein as the valence number.

Dimension I. R-O sub i: (1) descriptive, (2) denominative and (3) distributive;
Dimension II. R-O sub d: (1) icon, (2) index and (3) symbol;
Dimension III. R-O sub f: (1) abstractive, (2) concretive and (3) collective;
Dimension IV. R-I' sub i: (1) hypothetical, (2) categorical and (3) relative;
Dimension V. R-I' sub d: (1) sympathetic, (2) percussive and (3) usual;
Dimension VI. R-I' sub f: (1) term, (2) proposition and (3) argument;
Dimension VII. R-I" sub I: (1) instinctive, (2) experiential and (3) formal;
Dimension VIII. R-I" sub d: (1) suggestive, (2) imperative and (3) indicative;
Dimension IX. R-I" sub f: (1) emotional, (2) energetic and (3) logical;
Dimension X. R-R: (1) tone, (2) token and (3) type.

It will now be recognized that the invention has an expanded syntactics (the term "syntactics" is used to mean the relation among signs without regard to their meaning or their objects). Unlike the traditional definition of "syntactics", the syntactics of the invention is not limited to relations in Dimension X, the sign considered in itself, but may also involve other sign elements in other dimensions, for example, distributive, symbolic, collective, relative, usual, delomic/argument, formal, indicative, and logical, as well as sign elements in other valences from selective dimensions, for example, icons from Dimension II may have syntactic relevance with respect to any discussion of diagrammatic reasoning).

Each sign element may be resolved into finer sub-elements. Thus, taking the "icon" sign element as an example, we may distinguish an indexical icon from a symbolic icon. Without attaching labels to the granular refinements, granularity in the "collective" sign element of the "Of" dimension is depicted in FIG. 2 as "1.", "2." and "3.". Each numerical subscript is capable of further refinement into valences depicted in FIG. 2 as "a.", "b." and "c.". As suggested in the FIG. 2, this process of refinement may continue (i.e. "i", "ii", and "iii") and may be used to refine sign elements and sub-elements in one or more of the dimensions. It will now be appreciated that the richness of a dimension is directly proportional to the number of sign elements and sub-elements within the dimension.

A system utilizing the ten dimensional set of indicators includes a relational database for the database 20 that is searchable by the computer 10. The relational database associates a piece of media with one or more describers selected from a list of possible describers. For example, if the describers include the ten dimensions, and each dimension has three sign elements, 30 different describers will be needed, one describer for each possible dimension/sign element pair. For example, a piece of media may include a word or group of words that are identified for association with one or more describers. The identified words in the piece of media are then associated with a 32 bit vector. The bits corresponding to the describers to be associated with the identified words are turned on, for example, by changing the bit from a zero to a one. Then, when a search query is formulated such that the identified words appear in the search query along with signifiers corresponding to the bits turned on, extra weight will be given to the piece of media in order to identify it as particularly relevant to the query.

In the example given above, each vector reserves 30 bits, one for each possible describer, thereby leaving two bits available for other purposes. The remaining two bits may be used as wildcards to signal information about the identified words that are not provided by the 30 possible describers. For example, the two remaining bits may be used as triggers to greater refinement in a given dimension.

The semiotic dimensions, with their sign elements and valences, are independent of the type of media, language and content of the media. Consequently, the semiotic dimensions may be applied across heterogeneous formats and domains.

As an example of how the invention may be implemented for formatted text, standard HTML and XML tags may be used as descriptors to provide information about a text document. HTML tags for italic, bold, centering, underlining, and title, for example, all may be mapped as "tone" in Dimension X, by virtue of showing emphasis or intensity, and used to enrich standard weighting techniques of search engines. It is believed that such an application of the invention using HTML tags, augmented for example by word position, will yield a substantial improvement in properly identifying documents.

Similarly, HTML tags for picture or graph insets may be semiotically identified as an "icon" in Dimension II. HTML hypertext pointers may be semiotically identified both as "index" on Dimension II and "energetic" on Dimension IX. XML wildcards may be semiotically identified for "type" on Dimension X and "distributive" on Dimension I. In Dimension X, an input compossibly identified as tone, token (the default), and type, would clearly have greater weight if designated in a search query than the same input without such identification. When punctuation and English orthography are considered as a markup language, further automated parsing and mapping into the 10-Dimensional system is possible using orthographic elements as triggers for automated attribution of semiotic indicators. Of course, not all data in a piece of media need be associated with a descriptor, and not all semiotic dimensions need be activated. Note that although these examples are largely oriented to text, the same principles of application apply to other media and across media.

The invention not only stratifies information about media, but may be used along with more sophisticated and economical learning and data mining algorithms, logical operations, pattern recognitions, and other manipulations to enable more information to be gleaned from a search. For example, by taking into consideration how language is usually combined to express an idea, general rules may be discerned. For example, such rules may be founded on how words are logically combined or grammatically combined, or such rules may focus on the probability that a certain idea is associated with a portion of a particular media based on which describers are "on".

The invention may be implemented in the emerging discipline of ontology construction, which facilitates inference by providing a type hierarchy characterized by inheritance relations from upper level to lower level terms. These inheritance relations are variable, ranging from the broader and narrower terms of a Thesaurus to multiple inheritance, lattice-like relations in artifacts implementing first order logic and constructed as partially ordered sets. The most sophisticated ontologies are typically limited to whole-part and class-member relations. The invention provides a means by which an ontology may be enriched so as to differentiate the hierarchies using, for example, the dimensions III, VI, and IX to distinguish varieties of implication and entailment and the objects to which they apply. Using these three dimensions, a nine-cell matrix for all ontologies may be used:

| D-III | D-VI | D-IX |
|---|---|---|
| abstractive | term | emotional |
| concretive | proposition | energetic |
| collective | argument | logical |

Leaving aside the "emotional" interpretant (the element of the first valence in Dimension-IX), which would not normally be used, and treating Dimension-VI as the relational connector between the final object in Dimension-III and the final interpretant in Dimension-IX we already have 2×3×3 combinations across the three dimensions. We can then form various rules to provide further inferences by looking at inclusion relations and compossibilities within Dimension-III between collectives, on the one hand, and abstractives and concretives, on the other. One way of doing this may involve using sub-elements of one or more of the sign elements in Dimension VI.

The invention simplifies knowledge discovery and inference by enabling like-upon-like operations in a complex and heterogeneous database. For example, if the final continuant interpretant in Dimension IX is "energetic" (leading to action), the nature of the implication relation will differ from a "logical" interpretant. For example, "making an omelet" entails "breaking an egg" in a way different from that in which the food "egg" includes "omelet" as a narrower term, or in which "egg" implies "chicken", or vice versa. The invention permits segregation and stratification of differentiated relations, and allows for manipulation of these relations economically. Thus, "making an omelet" and "breaking eggs" would be parsed with indicators "on" in Dimension IX-valence 2 (energetic), Dimension III-valence 2 (concretive), and Dimension VI-valence 3 (argument). By contrast, "omelet" as an "egg" dish would be found in those same dimensions under Dimension IX-valence 3 (logical), Dimension III-valence 2 (concretive) and Dimension VI-valence 1 (term). Without such an ability to differentiate ontologies there will be anomalies of non-transitivity that plague artifacts that mix different types of signs, and try to perform logical operations upon them. The invention systematically divides the global information space applicable both to individual signs and to relations among them, with the relations also being susceptible to analysis as sign interpretants.

It is worth noting that the 10-Dimensional system described herein is not itself an ontology or type hierarchy. Although the sign elements are types in the meaning of Dimension X, and in their instantiation as bits they are also tokens, their compossible character means that there is no necessary hierarchical relation among sign elements of the same dimension. However, there may be theorems to limit the patterns in which they can co-occur, as described below in more detail.

The invention may be used to facilitate agent protocols. A computational agent is an autonomous, collaborative, intelligent, protocol-defined data system capable of acting both upon automatically perceived signals and on direct signals from a user. The agent is interactive with the relevant fields of data, with other agents and with its user. The protocol system of the agent may include parsing and mapping engines, machine learning algorithms, and search, retrieval, inference, pattern recognition and knowledge discovery capabilities. The applications specific to agents may focus on the full range of interpretant dimensions of the invention (Dimension IV through Dimension IX). Recall that the "interpretant" is defined as the effect of the sign on a mind or quasi-mind. As the agent is a quasi-mind, the agent's interpretants are the signals to which it responds and adapts. For example, for the three dimensions VII through IX relating the representamen to the continuant interpretant (R-I") in its immediate, dynamic and final forms the following matrix can be used:

| VII | VIII | IX |
|---|---|---|
| instinctives | suggestive | emotional |
| experiential | imperative | energetic |
| formal | indicative | logical. |

Dimension VII elements, when embodied in agent communication protocols, capture and provide modes of agent learning in response to a signal. An outside signal whose immediate interpretant is "instinctive" will be accepted or rejected in accordance with fixed agent behaviors. An "experiential" interpretant will be integrated into case-based learning. A "formal" interpretant will be integrated into rule-based learning. The degree to which these dimensions are divided, subdivided and further subdivided permits a learning continuum to reflect the adaptive capabilities of the agent to modify its knowledge and behavior in response to its environment, to other agents and user input.

Dimension VIII elements, when embodied in agent communication protocols, capture and provide for modes of agent acceptance of a signal. A "suggestive" signal appeals to possible behaviors without specificity. An "imperative/interrogative" signal provides an order to the agent, which may also be in the form of a query. An "indicative" signal provides information to be taken into account. Again, finer divisions, subdivisions and further subdivisions permits these modes to flow into a continuum.

Dimension IX elements, when embodied in agent communication protocols, capture and provide for modes of agent orientation, leading to feeling in the case of the "emotional" interpretant (for a computational agent, a "feeling" may be translated as a value outside the normal economic scale of values), action for the "energetic" interpretant, and understanding for the "logical" interpretant.

Another example of how the invention may be implemented is as a semiotic theorem tester. Since Peirce's sign element theory became publically available in the 1950s via incomplete and sometimes inconsistent versions, there has been increasing work to develop and refine it, to provide formal proofs of the underlying mathematics, and to relate it to emerging work in computational fields. What has been lacking is an empirical testbed designed for the purpose. The 10-Dimensional system of the invention provides such a testbed. It opens a new field of algebra that formally specifies the relations and permissible computational operations upon sign elements. A specific focus of such an algebra will be to test theories about the role of sign valences in attracting or repelling certain combinations of sign elements, both theoretically and empirically.

At the theoretical level, there has been some work to suggest that the actual number of stable dimension-sign combinations—in principle, 3 to the tenth power or 59,049 combinations—may be limited to under 100, with 66 being the most often cited number. How to prove conjectures of this kind is itself at issue, since the sign elements are pre-mathematical. Once the relationship between a sign element and its computational embodiment is established, the corresponding algebra will serve as a laboratory for the study of signs and semiotic combinatorics more generally.

At the empirical level, data enriched by some or all of the dimensions can be used as a training bed to produce algorithms to improve precision and recall of retrieved information. Such data can also be mined for rules and probabilistic relations that can, in turn, be managed with a modularized addition. For example, an algebra can produce a formally defined and empirically testable ontology calculus, which will distinguish the several kinds of inheritance that characterize different reference ontologies, stipulate rules for storing them efficiently, avoid confusions among them, and permit transitive inference from upper level artifacts to domain ontologies of compatible sign elements. At the global theoretical level, such an algebra becomes a testbed for theorems about the ten dimensional system itself. It has, for example, been argued that certain dimensions may be subordinated to others to reduce the number of active elements to be considered, or alternatively, that combinations containing repelling valences are unstable or impossible. The invention permits experiments to test these hypotheses.

Although the present invention has been described with respect to particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A semiotic analysis system comprising:
    at least one computer including software disposed thereon that is capable of causing the computer to receive at least one query including query signs and to search at least one database for at least one entry related to the at least one query, the at least one query being associated with at least one signifier that identifies at least one semiotic property among at least some of the query signs; and
    at least one database in communication with the at least one computer, the at least one database including at least one entry, in which at least one portion of the at least one entry includes entry signs and is associated with at least one describer that identifies at least one semiotic property among at least some of the entry signs included in the at least one portion,
    wherein the at least one semiotic property is a member a group of semiotic properties, in which the group includes between two and ten different dimensions of semiotic relations, in which each dimension is divided into at least three types of sign elements, each of which can be further subdivided, and in which each semiotic property is independent of the thematic content denoted by signs, and
    wherein the software is capable of determining the semiotic similarity between the at least one query and the at least one portion of the at least one entry on the basis of:
        the at least one semiotic property associated with the at least one query, and
        the at least one semiotic property associated with the at least one portion of the at least one entry.

2. The system of claim 1, wherein the dimension is a relation between a representamen and an immediate object.

3. The system of claim 2, wherein the dimension includes at least one of a descriptive, a denominative, and a distributive element.

4. The system of claim 1, wherein the dimension is a relation between a representamen and a dynamic object.

5. The system of claim 4, wherein the dimension includes at least one of an iconic, an indexic, and a symbolic element.

6. The system of claim 1, wherein the dimension is a relation between a representamen and a mode of being of an object.

7. The system of claim 5, wherein the dimension includes at least one of an abstractive, a concretive, and a collective element.

8. The system of claim 1, wherein the dimension is a relation between a representamen and an immediate occurent interpretant.

9. The system of claim 8, wherein the dimension includes at least one of a hypothetical, a categorical, and a relative element.

10. The system of claim 1, wherein the dimension is a relation between a representamen and a dynamic occurent interpretant.

11. The system of claim 10, wherein the dimension includes at least one of a sympathetic, a percussive, and a usual element.

12. The system of claim 1, wherein the dimension is a relation between a representamen and a final occurent interpretant.

13. The system of claim 12, wherein the dimension includes at least one of a term, a proposition, and an argument element.

14. The system of claim 1, wherein the dimension is a relation between a representamen and an immediate continuant interpretant.

15. The system of claim 14, wherein the dimension includes at least one of an instinctive, an experiential, and a formal relationship.

16. The system of claim 1, wherein the dimension is a relation between a representamen and a dynamic continuant interpretant.

17. The system of claim 16, wherein the dimension includes at least one of a suggestive, an imperatives, and an indicative element.

18. The system of claim 1, wherein the dimension is a relation between a representamen and a final continuant interpretant.

19. The system of claim 18, the dimension includes at least one of an emotional, an energetic, and logical element.

20. The system of claim 1, wherein the dimension is a relation of a representamen to itself, separated from its relations to objects and interpretants.

21. The system of claim 20, wherein the dimension includes at least one of a tone, a tokens, and a type element.

* * * * *